United States Patent Office 3,523,605
Patented Aug. 11, 1970

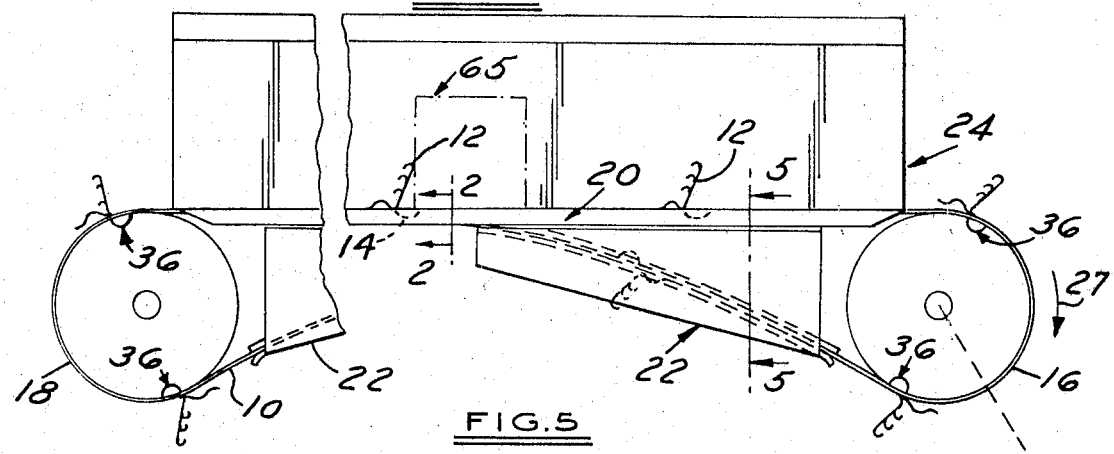
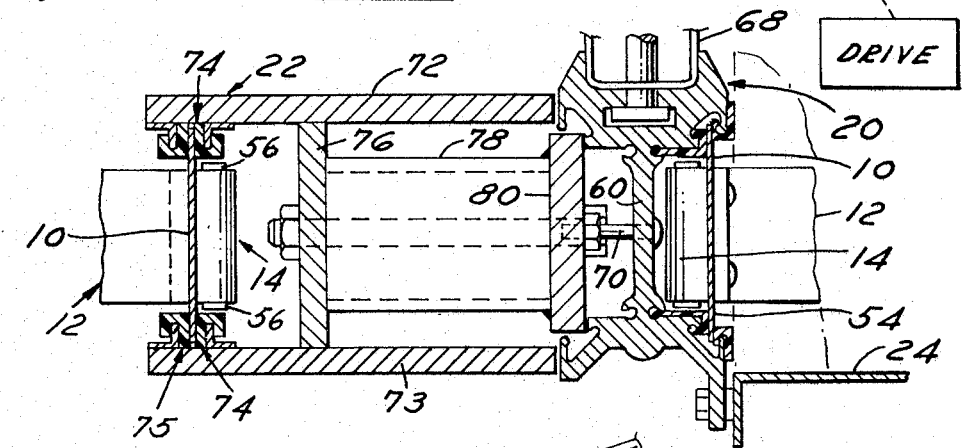
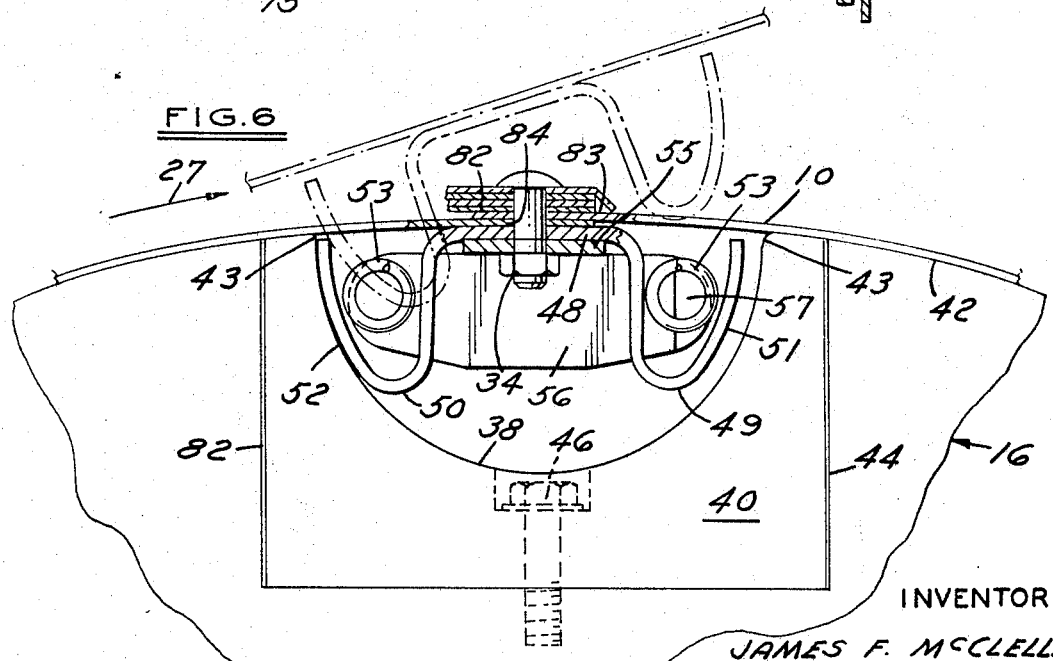

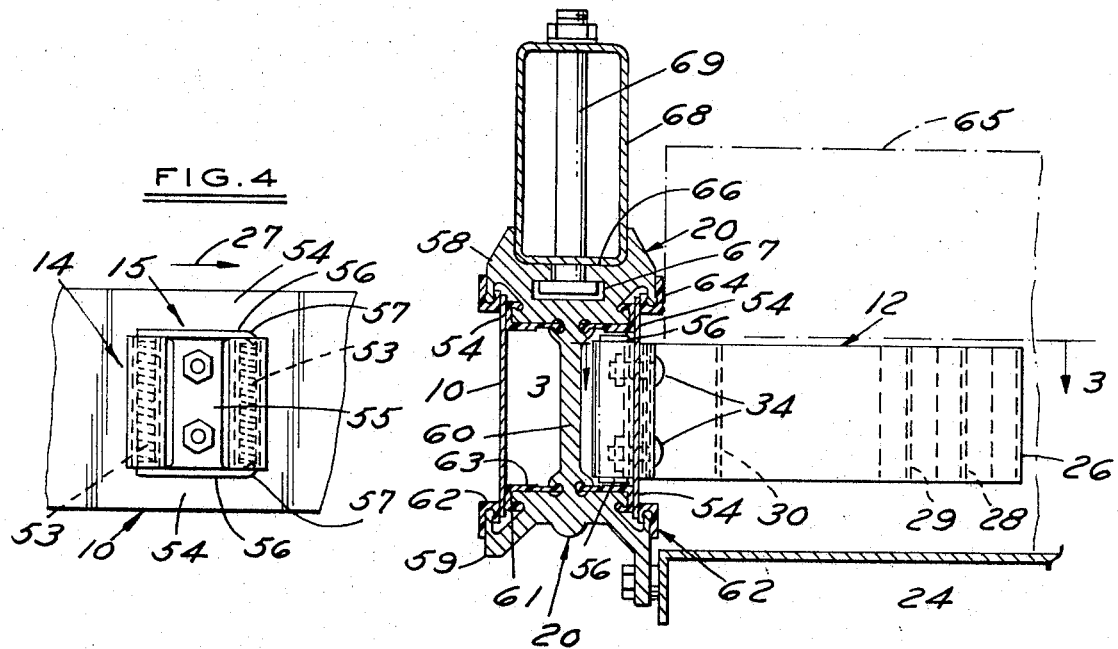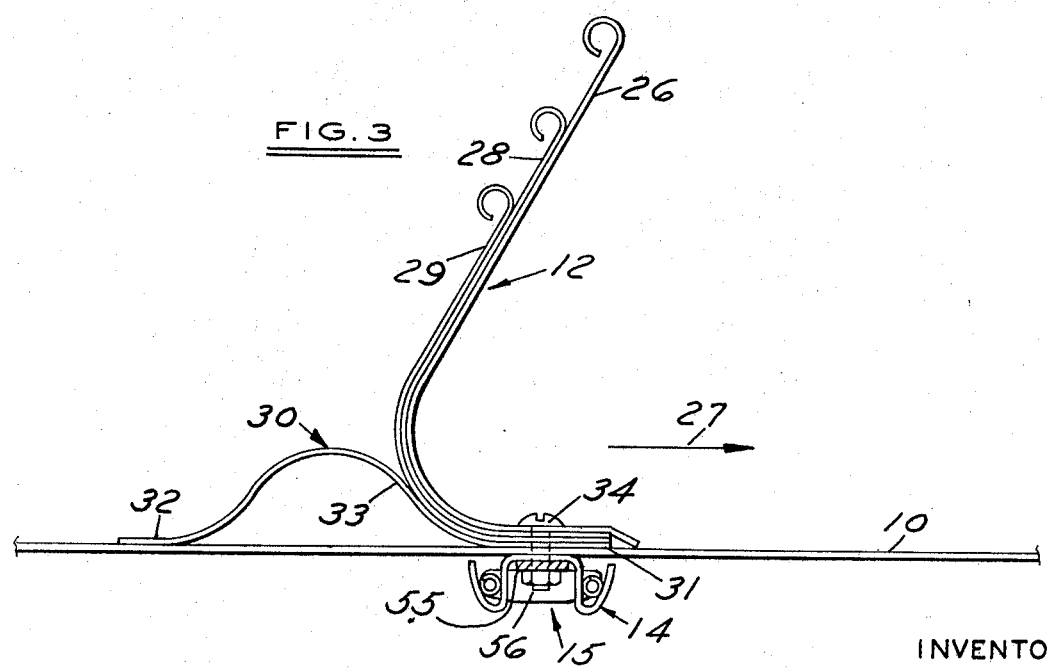

3,523,605
BELT CONVEYOR CONSTRUCTION
James F. McClelland, Jr., Grosse Pointe Farms, and Robert J. Ebbert, Rochester, Mich., assignors, by mesne assignments, to SI Handling Systems, Inc., Easton, Pa., a corporation of Pennsylvania
Filed Aug. 17, 1967, Ser. No. 661,447
Int. Cl. B65g *19/02, 19/18*
U.S. Cl. 198—171                    27 Claims

ABSTRACT OF THE DISCLOSURE

An endless, pulley driven conveyor in which the endless member is a flexible metal belt equipped with a series of driving lugs on the inner belt face engageable with driving sockets in the pulley periphery, and equipped with a series of pushers secured to the outer belt face. Each driving lug is constructed with driving socket engaging faces that are resiliently movable relative to and longitudinally of the metal belt, and preferably the driving sockets and driving lugs are formed as generally semi-cylindrical segments on axes which extend parallel to the axes of pulley rotation. Each driving socket is adjustably positionable on the pulley periphery. A beam, provided with oppositely facing channels, supports and guides both forwarding and return runs of the belt intermediate a pair of pulleys in directions both transverse to the belt length and perpendicular to the belt faces so that the belt can be operated in any position.

BACKGROUND OF THE INVENTION

Field of the invention

This invention relates to an improved belt conveyor construction of the geared type in which the belt is equipped with driving lugs engageable with driving elements in the sprockets or pulleys around which the belt is trained, and to a flexible metal belt conveyor of this type equipped with pushers and supported and guided intermediate the pulleys.

Description of the prior art

The overall object of the present invention is to provide a geared belt conveyor equipped with pushers and capable of being operated over relatively long runs (upwards of 100 feet) for propelling articles along a support, and particularly adapted to the conveying of articles in automatic warehouse installations. Although many examples of belt and sprocket gearing are found in the prior art, no prior construction is presently known which incorporates the features provided by the present invention for overcoming the problems encountered in positively driving, supporting and guiding a flexible metal pusher belt conveyor over relatively long distances.

SUMMARY OF THE INVENTION

The invention provides a conveyor of the type including a pair of pulleys around which an endless member is trained and means for driving one of the pulleys, wherein the endless member comprises a flexible metal belt having an inner face engageable with the pulleys and a series of driving lugs, secured to the inner face at spaced intervals along the length of the belt, engageable with driving means on the driving pulley. A series of pushers are secured to the outer face of the metal belt at spaced intervals along the length thereof, and the belt is supported and guided intermediate the pair of pulleys.

The driving means on the driving pulley for engaging the driving lugs on the belt preferably comprises a plurality of driving sockets provided on the periphery of the pulley, each socket having the shape of a semi-cyclindrical recess the axis of which extends parallel to the axis of pulley rotation, and each driving lug on the belt is formed as a truncated semi-cylindrical segment having a radius less than the radius of the socket on the pulley with curved driving socket engaging faces extending transversely to the direction of belt travel. These curved driving socket engaging faces on the driving lugs of the belt are resiliently movable relative to and longitudinally of the belt to compensate for changes in belt length in service; and, each driving socket is formed as a separate socket member secured to the pulley for adjustable positioning circumferentially thereof so that the sockets can be precisely set to conform to the normal spacing of the driving lugs on the belt.

Preferably also the pushers and driving lugs are mounted on opposite faces of the belt in back-to-back relation and secured to the belt by the same fastening elements, with the pushers and driving lugs having a dimension transversely of the belt less than the belt width so as to leave marginal portions along the belt for the guiding and support thereof. A guiding and supporting beam is provided and mounted between the pair of pulleys around which the belt is trained. This beam is formed with oppositely facing belt channels each equipped with belt guides engaged by the marginal portions of the inner and outer belt faces and by guide shoes, which are secured to the belt with the driving lugs and have surfaces extending longitudinally of the belt perpendicular to the faces thereof. The forwarding and return reaches of the belt are thus supported in any position by a single member in side-by-side relation, and the arc of engagement between the belt and each pulley is increased.

Other features and advantages of the invention will appear from the description to follow of the representative embodiment disclosed in the accompanying drawings.

DESCRIPTION OF THE DRAWINGS

FIG. 1 is a schematic plan view of a belt conveyor installation;

FIG. 2 is an enlarged sectional elevation taken as indicated by the line 2—2 of FIG. 1, showing the beam for supporting the forwarding and return runs of the belt;

FIG. 3 is an enlarged plan view on the line 3—3 of FIG. 2 showing the construction of a pusher and driving lug on the belt;

FIG. 4 is a view of a driving lug assembly taken as indicated by the line 4—4 of FIG. 3;

FIG. 5 is a sectional elevation taken as indicated by the line 5—5 of FIG. 1 showing the construction of the guide for the return run of the belt adjacent one of the pulleys; and FIG. 6 is an enlarged fragmentary view showing the relation of a driving lug to a driving socket on the pulley.

DESCRIPTION OF THE PREFERRED EMBODIMENT

The principal components of the construction of the invention include an endles metal belt 10, to which pushers 12, and driving lugs 14 and guide shoes 15 are attached as best shown in FIG. 3, trained about a driving sprocket 16 and an idler sprocket 18, and supported and guided intermediate the sprockets by an I-section beam 20 (FIG. 2) with sweep-back guides 22 being provided adjacent the sprockets 16 and 18. The pushers 12 may project outwardly over any desired form of article support, such as the surface 24 illustrated, or a roller bed; or the belt conveyor and pushers can of course be used in any other manner desired.

Referring to FIG. 3, the belt 10 is a relatively thin flexible strip of metal. The pushers 12, driving lugs 14 and guide shoes 15 are each also of sheet metal construction.

Each pusher 12 is a multi-leaf assembly consisting of a main article contacting element 26 inclined in the forward direction of travel indicated by the arrow 27, and reinforced by a series of progressively shorter elements 28 and 29, each of resilient construction. A stabilizing leaf 30 includes a forward portion 31 mounted between the pusher elements and the belt, a free terminal portion 32 engageable with the belt at a location rearwardly of the pusher elements, and an intermediate portion 33 which further reinforces and is capable of resisting deflection of the pusher elements 26, 28 and 29 in the rearward direction longitudinally of the belt.

The pusher assembly 12 including the stabilizing leaf 30, a driving lug 14, and a guide shoe 15 are all secured to the belt in back-to-back relation by common fastening elements 34. This form of construction is preferred because of its simplicity because it offers minimum resistance to flexing of the belt, and results in the least possible number of attachments being made to the belt with consequent minimum reduction in the belt strength.

In the construction shown in FIG. 1, the number of pusher and driving lug assemblies attached to the belt 10 has been determined by the spacing desired between adjacent pushers 12, and the sprocket 16 and 18 which are each equipped with driving means 36 for engaging the driving lugs 14, have been made large enough in diameter so that each of the sprockets will always have driving engagement with at least one driving lug 14 on the belt. The driving means on each of the sprockets 16 and 18 comprise a plurality of driving sockets (preferably the minimum number of two), each socket having the shape of a semi-cylindrical recess 38 (FIG. 6) formed in a separate socket member 40, the axis of the semi-cylindrical recess 38 being displaced inwardly of the sprocket periphery 42, and being preferably located slightly within a line drawn between the edges 43 of the recess 38. Each socket member 40 is positioned in a suitable notch 44 in the sprocket, is secured to the body of the sprocket by fastening elements 46, and has been made slightly smaller than the notch 44 so that the center of the driving socket may be adjusted circumferentially in order to provide some compensation for manufacturing tolerances in the sprocket and in the relative positioning of the driving lugs 14 on the belt 10.

Further compensation for such inaccuracies is provided by the construction of the driving lugs. As best shown in FIGS. 3, 4 and 6, each driving lug 14 includes a central portion 48 secured to the belt by the bolts 34, and a pair of end portions 49 and 50, the end portions being provided with curved driving socket engaging faces 51 and 52 respectively, each terminating in a normally spaced relation with the inner surface of the belt 10. The socket engaging faces 51 and 52, taken together, have the effective shape of a truncated semi-cylindrical segment formed on a radius less than the radius of the semi-cylindrical socket 38 on the sprocket; the faces 51 and 52 extend transversely to the direction of belt travel, are each reinforced by a spring 53, and the driving lug 14 is a flexible member so that the faces 51 and 52 are resiliently movable relative to and longitudinally of the belt 10. This construction of the driving lug contributes to the proper seating thereof in a driving socket and does not restrict flexibility of the metal belt 10 in passing around the periphery of one of the sprockets 16 or 18.

It can be seen from FIGS. 2, 4 and 5 that the pusher members 12 and driving lugs 14 each have a width less than the width of the metal belt 10 and are secured to the metal belt in centered relation to the longitudinal center line thereof, thereby providing a free continuous marginal portion 54 along each face of the belt, which with the guide shoes 15 enables the belt 10 to be continuously supported and guided by the elements 20 and 22 intermediate the pair of sprockets 16 and 18. Each guide shoe 15, as best shown in FIGS. 3 and 4, has a transverse base 55 and a pair of flanges or runners 56 extending perpendicular thereto along the side edges of the lug 14, each runner having an inturned forward end portion 57.

The supporting beam 20 is preferably extruded as generally I-section member having a pair of end flanges 58 and 59 joined by a central web 60 thereby forming a pair of opposed channels. Extruded inner and outer plastic guide strips 61 and 62 are mounted as shown to form a pair of transversely aligned guide slots in each of the opposed channels for receiving the marginal portion 54 of the belt 10, the inner strip 61 including a surface 63 engageable by a guide shoe runner 56, and the outer strip 62 including a surface 64 engageable by an article 65 on the conveyor bed 24. Thus the belt is guided and supported longitudinally and transversely by the guide strips and the beam 20 may be mounted in any spatial orientation.

For mounting the beam 20, the end flange 58 thereof has an elongated channel 66 formed therein with a T-shaped slot 67 in the bottom of channel 66, thereby providing a means for securely fastening the beam 20 to a frame member 68 which is received in the channel 66 and secured to the beam by a headed fastening element 69 engaging the T-shaped slot 67. The structure of the beam 20 thus forms a single continuous means for accurately and compactly supporting both the forwarding and return runs of the belt 10 intermediate a pair of sprockets.

As shown in FIG. 5, the beam 20 also supports the sweep-back assembly 22 which is connected to the beam 20 by bolts 70 extending through the center web 60. The sweep-back assembly 22 consists merely in a pair of side plates 72 and 73 each carrying inner and outer guide strips 74 and 75 for engaging the belt margins 54, and guide shoe runners 56, the side plates 72 and 73 being connected by suitable cross members 76 which are each in turn mounted on a post 78 of suitable length welded to a base plate 80 which the mounting bolts 70 engage.

Frame structure other than the member 68 for supporting the I-beam 20 has not been shown because the designing of such structure is a matter of ordinary skill, and moreover because the means provided by the beam 20 and sweep-back assembly 22 for supporting and guiding the metal belt 10 enable the belt to be mounted in any relation desired to a horizontal or vertical plane of reference. Such frame structure should be designed so that the beam 20 is positioned with one of its guide channels substantially tangent to the periphery of each of the sprockes 16 and 18.

The flexible metal belt 10 has the advantage of dimensional stability in service as compared to conventional conveyor chains which gradually increase in length due to wear between the links and connecting pins. This flexibility of the belt 10 does present problems in driving the belt in a geared manner by driving lugs and sockets, because if a driving lug does not properly enter a socket, or remain properly seated therein as driving force is imparted to the lug, or disengage freely from the socket, the belt may bend, flex and fail.

In the present invention, the following features, best understood from a consideration of FIG. 6, contribute to the proper engagement of the driving lugs in the socket members, the disengagement therefrom, and to the transmission of driving force from the driving sprocket 16 to the belt 10:

(a) Engagement between the driving face of a lug 14 (the face 52, FIG. 6) and surface of the recess 38 of a properly positioned socket member 40 does not take place until the lug is practically fully seated in the recess because of the curved shapes of the recess and of the lug faces 51 and 52 and the fact that the radius of curvature of the lug faces is smaller than that of the recess. The angle of approach is practically zero.

(b) This steeper curve of the lug faces results in theoretical line contact between a lug and socket member adjacent an outer edge 43 of the recess 38, and in a line of action (i.e., a line normal to the curves at their point of contact) substantially tangential to the sprocket.

(c) The line of action is close and parallel to the resisting force on the belt thereby minimizing the force couple which tends to lift the lug out of the recess and enabling proper lug engagement to be maintained with minimum belt tension.

(d) Additionally, the driving sprocket 16 must be made so that the circumferential distances from the trailing edge of one recess 38 to the trailing edge of the following recess 38 must be equal. The separate socket members 40 may be individually adjusted and located by a suitable shim 82 so that this dimensional accuracy can be easily obtained.

(e) This socket-to-socket dimension must also be correlated of course with the center-to-center dimension between adjacent driving lugs on the belt, and the driving sprocket 16 should be designed to compensate for the slight increase in lug-to-lug spacing which will result from stretch in the belt in service. A slight increase in the diameter of the driving sprocket 16 will provide this compensation. For example, with a driving sprocket having a diameter (calculated from the pusher-to-pusher spacing desired) in the order of 16 inches, an increase in diameter of $10/1000$ of an inch is adequate. The belt tends to slip backwards on the driving sprocket 16 so that if the diameter is increased too much, a driving lug may tend to bind rather than freely disengage from a driving recess.

Lubrication of the entire system with a light oil is advisable in order to further assure easy entry of a lug into a driving recess and exit therefrom, and to reduce drag between the belt 10 and guide shoes 15 and the supporting and guiding members 20 and 22.

The idler sprocket 18, while shown as being provided with means 36 engageable with the driving lugs 14, may alternately be formed with a continuous channel around the periphery thereof for non-engagement or clearance with the driving lugs and frictional engagement with the marginal portions 54 of the inner face of the belt.

Tensioning of the belt into snug engagement with the sprockets is preferably accomplished by adjustably mounting the idler sprocket 18 so that the center-to-center distance between the sprockets 16 and 18 can be changed.

The belt 10 may consist of a plurality of strips or sections, connected together as shown in FIG. 6 by the bolts 34, with the rearward end 82 of the leading section 83 outwardly overlapping the forward end 84 of the trailing section.

While preferred embodiments have been described above in detail, it will be understood that numerous modifications might be resorted to without departing from the scope of the invention.

What is claimed is:

1. A conveyor of the type including a pair of pulleys around which an endless member is trained and means for driving one of the pulleys characterized by the endless member comprising a flexible metal belt having an inner face engaging the pulleys, a series of discrete driving lugs of flexible sheet metal secured to the inner face of the metal belt at spaced intervals therealong, said belt having an outer face, a series of pusher members secured to the outer face of the belt at spaced intervals along the length thereof, means on the driving pulley for engaging the driving lugs of said metal belt, said pusher members and driving lugs each having a width less than the width of the metal belt and being secured to the metal belt in centered relation to the longitudinal center line thereof providing a marginal belt portion on each side of the pusher and driving lug, and means supporting and guiding the marginal portion of the metal belt intermediate the pair of pulleys.

2. A conveyor as claimed in claim 1 wherein each driving lug is secured to the metal belt by connecting means which also secures one of the pusher members thereto.

3. A conveyor as claimed in claim 1 wherein the means on the driving pulley for engaging the driving lugs comprises a plurality of driving sockets provided on the periphery of the pulley, each socket having the shape of a semi-cylindrical recess the axis of which extends parallel to the axis of pulley rotation, and wherein each driving lug on the metal belt is formed as a truncated semi-cylindrical segment having a radius less than the radius of the semi-cylindrical socket on the pulley, each driving lug having arcuate driving socket engaging faces extending transversely to the direction of belt travel.

4. A conveyor as claimed in claim 3 wherein each driving lug is constructed so that the arcuate driving socket engaging faces thereof are resiliently movable relative to and longitudinally of the metal belt.

5. A conveyor as claimed in claim 3 wherein the axis of each semi-cylindrical driving socket is displaced inwardly toward the center of pulley rotation from the periphery of the pulley.

6. A conveyor as claimed in claim 1 further including means secured to the belt providing runners extending perpendicular to the belt faces and parallel to and inwardly of the belt edges.

7. A conveyor as claimed in claim 6 wherein the means supporting and guiding the belt intermediate the pair of pulleys includes guide means engaging the runner means and the marginal portions along the inner and outer belt faces.

8. A conveyor as claimed in claim 1 wherein a guide shoe member is secured to the belt with a driving lug, the guide shoe member having runners extending perpendicular to the belt inner face along the longitudinal edges of the driving lug.

9. A conveyor as claimed in claim 1 wherein the means supporting and guiding the metal belt intermediate the pair of pulleys comprises a beam having a generally I-shaped section with a pair of end flanges joined by a center web forming a pair of opposed channels, and guide means in each channel for engaging the marginal portions of the metal belt.

10. A conveyor as claimed in claim 9 wherein the guide means includes inner and outer guide strips carried by the beam forming a pair of guide slots in each channel thereof for receiving the marginal portions of the belt, one of the inner and outer guide strips having a guide surface extending perpendicular to the belt face, and runner means on the belt engageable with said guide surface.

11. A conveyor as claimed in claim 10 wherein the inner guide strips are provided with said guide surface and the outer guide strips are provided with a surface extending parallel to the guide slot and located outwardly thereof with respect to the center line of the beam.

12. A conveyor as claimed in claim 9 wherein the belt supporting and guiding beam is provided with a longitudinally extending channel formed in one of the end flanges thereof and a T-shaped slot formed in the bottom of said channel, and means for supporting the beam including a frame member received in said channel and connected to the beam by a headed fastening element mounted in said T-shaped slot.

13. A conveyor as claimed in claim 9 wherein the belt supporting and guiding beam is provided with means on one of the end flanges thereof for securing article supporting conveyor structure thereto.

14. A conveyor as claimed in claim 1 wherein each pusher member is of multi-leaf construction including a main pusher member projecting from the outer face of the metal belt, and at least one supplementary member resiliently resisting any deflection of the main pusher member longitudinally of the belt.

15. A conveyor as claimed in claim 14 wherein each pusher member includes a base portion secured to the metal belt, an outer portion inclined in the direction of belt travel, and a curved portion connecting the base and outer portions so that the base portion lies within the outer portion.

16. A conveyor as claimed in claim 15 wherein each pusher member is further provided with a stabilizing leaf having a portion mounted between the belt and the base portion of the pusher, an arcuate portion conforming to at least a part of the curved portion of the pusher, and a terminal portion engageable with the belt at a location rearwardly of the base portion of the pusher with respect to the forwarding direction of belt travel.

17. A conveyor comprising a pair of pulleys around which an endless member is trained, means for driving one of the pulleys, said endless member being a flexible metal belt having an inner face engaging the pulleys, a series of discrete driving lugs secured to the inner face of the belt at spaced intervals therealong, a series of pusher members secured to the outer face of the metal belt at spaced intervals along the length thereof, means on the driving pulley for engaging the driving lugs including a plurality of driving sockets on the periphery of the driving pulley, each driving socket being formed in a socket member separate from the driving pulley, and means securing each socket member for adjustable positioning circumferentially of the periphery of the driving pulley.

18. A conveyor as claimed in claim 17 wherein each socket member is provided with a socket in the form of a semi-cylindrical recess, the axis of which recess extends substantially parallel to the axis of pulley rotation when the socket member is secured to the pulley, and wherein each driving lug includes a pair of arcuate socket engaging faces spaced apart a distance less than twice the radius of the socket.

19. A conveyor as claimed in claim 18 wherein each driving lug includes a central portion secured to the metal belt and a pair of end portions, each end portion having an arcuate driving socket engaging face terminating in a normally spaced relation with the inner surface of the metal belt.

20. A conveyor as claimed in claim 19 wherein the arcuate driving socket engaging faces of each driving lug are normally spaced apart a distance less than twice the radius of the cylindrical driving socket.

21. A conveyor as claimed in claim 17 wherein each driving lug includes a pair of socket engaging faces resiliently movable relative to and longitudinally of the metal belt.

22. A conveyor of the type including a pair of pulleys around which an endless member is trained and means for driving one of the pulleys, characterized by the endless member comprising a flexible metal belt having an inner face engageable with the pulleys and an outer face, a series of driving lugs secured to the inner face of the metal belt at spaced intervals along the length thereof, a series of pusher members secured to the outer face of the metal belt at spaced intervals along the length thereof, means on the driving pulley for engaging the driving lugs, and means supporting and guiding the metal belt intermediate the pair of pulleys, said last-mentioned means comprising a beam of I-section having a central web and a pair of end flanges forming oppositely facing belt channels, guide means mounted on each belt channel for receiving the marginal portions of the metal belt, and means mounting the I-beam with the guide means on one of the belt channels substantially tangent to the periphery of the driving pulley.

23. In a gear belt and sprocket conveyor of the type having a series of independent driving lugs secured to the inner face of the belt at spaced points therealong for engagement with driving means on a sprocket, the improvement comprising each driving lug being constructed with a pair of arcuate sprocket engaging faces resiliently movable relative to and longitudinally of the belt, and means securing each lug to the belt intermediate the ends of the lug.

24. A conveyor as claimed in claim 23 wherein the driving means on the sprocket comprises a plurality of driving sockets, each socket having the shape of a semi-cylindrical recess the axis of which extends parallel to the axis of sprocket rotation, and wherein the sprocket engaging faces of each driving lug have a curved shape and are spaced apart a distance less than twice the radius of the semi-cylindrical socket.

25. A conveyor as claimed in claim 23 wherein the driving means on the sprocket includes at least one driving member separate from the sprocket, and means securing such driving member to the sprocket for adjustable positioning circumferentially thereof.

26. A conveyor as set forth in claim 23 wherein each driving lug includes means resiliently reinforcing the sprocket engaging faces for biasing the faces away from each other.

27. A conveyor in accordance with claim 23 wherein the ends of said lugs are adjacent the belt but free from attachment to said belt.

References Cited

UNITED STATES PATENTS

| 636,557 | 11/1899 | Reeves | 198—198 |
| 1,614,266 | 1/1927 | Tschoppat | 74—244 |
| 1,770,099 | 7/1930 | D'Humy | 198—204 |
| 2,627,338 | 3/1953 | Vodoz | 198—137 |
| 2,667,263 | 1/1954 | Bigler | 198—171 |
| 2,669,127 | 2/1954 | Raser. | |
| 3,245,518 | 4/1966 | Reibel | 198—198 |

FOREIGN PATENTS

| 821,303 | 11/1951 | Germany. |
| 588,981 | 6/1947 | Great Britain. |

RICHARD E. AEGERTER, Primary Examiner